United States Patent [19]

Disselbeck et al.

[11] 4,289,627
[45] Sep. 15, 1981

[54] LIQUID FILTRATION PROCESS

[75] Inventors: Dieter Disselbeck, Bad Soden am Taunus; Gerhard Neumann, Frankfurt am Main; Karl-Heinz Ott, Kelkheim; Günther Strobel; Edwin Zalewski, both of Hofheim am Taunus, all of Fed. Rep. of Germany

[73] Assignee: Hoechst Aktiengesellschaft, Frankfurt am Main, Fed. Rep. of Germany

[21] Appl. No.: 71,296

[22] Filed: Aug. 30, 1979

[30] Foreign Application Priority Data

Jan. 15, 1979 [DE] Fed. Rep. of Germany ....... 2901397

[51] Int. Cl.³ ............................................. B01D 39/08
[52] U.S. Cl. .................................... 210/702; 210/767; 210/507
[58] Field of Search ................. 210/10, 496, 499, 501, 210/507, 609, 702, 767; 139/426 R

[56] References Cited

U.S. PATENT DOCUMENTS

| | | | |
|---|---|---|---|
| 2,903,021 | 9/1959 | Holden et al. | 139/426 R |
| 3,383,278 | 5/1968 | Helland | 210/499 X |
| 3,473,576 | 10/1969 | Amneus | 210/499 X |
| 3,527,698 | 9/1970 | Von Reppert et al. | 210/10 |
| 3,803,453 | 4/1974 | Hull | 139/426 R |
| 3,817,739 | 6/1974 | Abbott et al. | 210/507 X |
| 4,158,627 | 6/1979 | Ingemarsson | 210/10 X |

Primary Examiner—Thomas G. Wyse
Attorney, Agent, or Firm—Hammond & Littell, Weissenberger and Muserlian

[57] ABSTRACT

A three dimensional filter element of a porous fabric of synthetic fibers wherein the individual threads are bound to each other as to be unshiftable, said fabric having an air permeability of more than 50 l/dm². min at a pressure difference of 2 millibar and resisting to a permanent load over the entire filter area without the formation of free regions and a method for the separation of solid material from a liquid phase by means of the three-dimensional filter element preferably by gravity.

4 Claims, 2 Drawing Figures

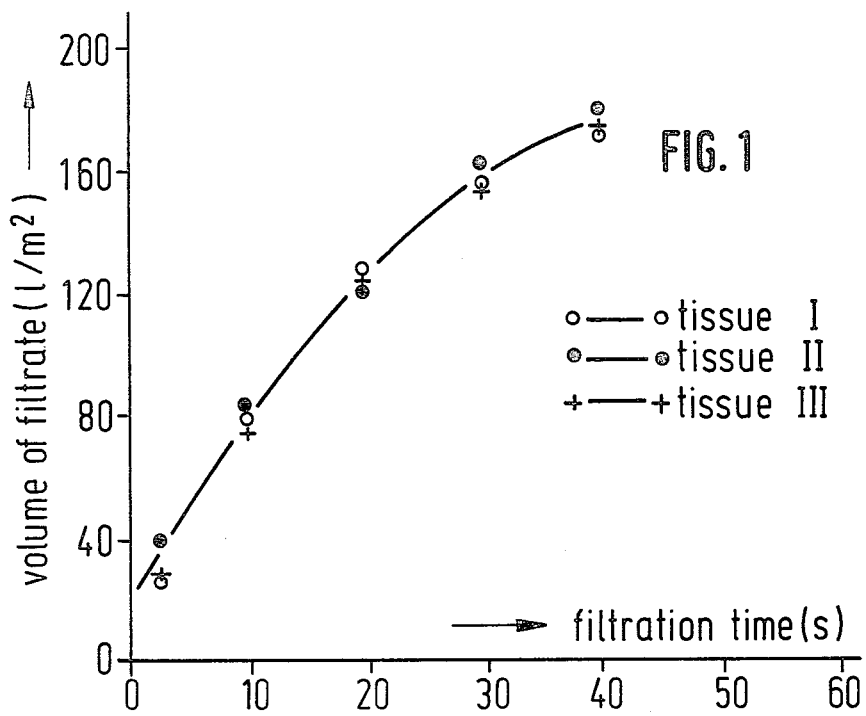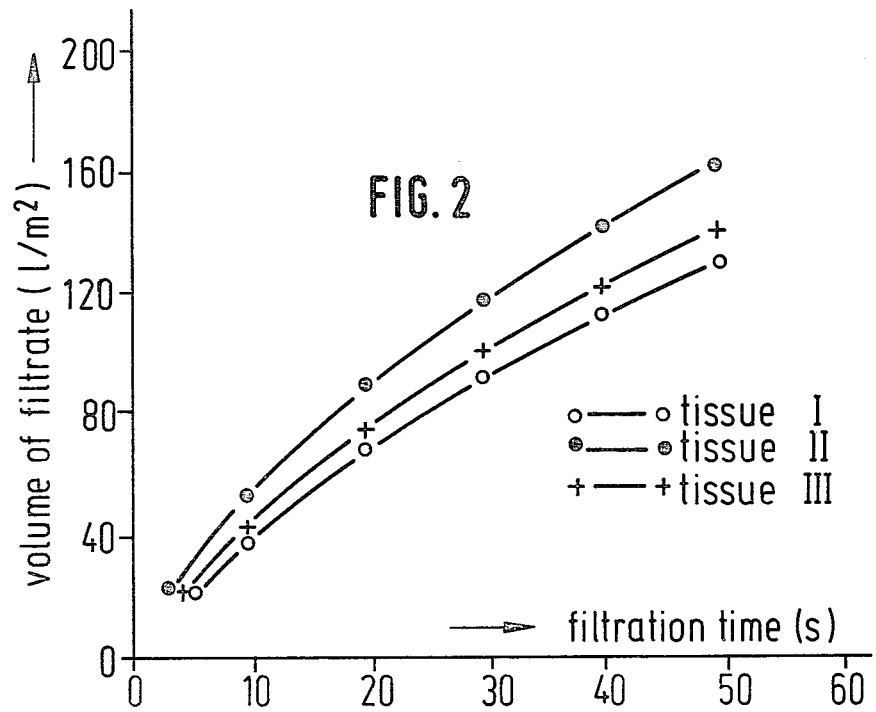

LIQUID FILTRATION PROCESS

A process is known for the separation of media of different consistency, for example of waste waters or sludges, which comprises using three-dimensional, preferably bag-shaped filter elements having a capacity of 50 to 5,000 liters and more.

Hitherto, a fabric of polyester fibers of a setting P 2/2, 8.5/8.5 filaments per centimeter in the warp and weft (so-called panama weave) has been used for the manufacture of large volume filter elements. The fabric has an air permeability of about 580 l/dm$^2$.min with a pressure difference of 2 millibar. It proved its suitability especially for dewatering municipal sludges. The advantageous features of the polyester fabric are its high strength, a good draining capacity and a low tendency to clogging. Moreover, the production of the fabric is cheap and it has a long service life.

In other words, to achieve an optimum dewatering effect the fabric used for sludge filters of this type must have a certain porosity, which has to be chosen in a manner such that solid particles of a definite size are held back with certainty while smaller particles pass the fabric together with the liquid phase. According to the state of art this defined porosity or air permeability is obtained by a special arrangement of the warp and weft threads of the fabric so that e.g. between two warp threads or two weft threads respectively, a distance of 1 or 2 threads remains. By a setting of this type, in which the individual threads do not lie closely to one another, a fabric having a very weak coherence only is obtained, that is to say the individual threads of warp and weft can be easily pushed apart, which results in a variable porosity of the fabric so that in these regions larger amounts of sludge and liquid phase pass through the fabric than intended. This is defined as thread displacement. In some cases, an insufficient filtering effect of these sludge filters is observed.

It has also been proposed to keep the weft threads of the fabric in the critical regions in a closer setting than in the other regions of the sludge filter. This results, of course, in a better connection of the fabric in these regions and thread displacement of the filling threads cannot occur so easily. But this cannot be fully excluded so that, inspite of the closer setting of the weft threads, the aforementioned disadvantage is not eliminated. Moreover, the dewatering efficiency of the sludge filter is reduced distinctly in the regions with a closer set of the filling threads by the lower porosity of the fabric.

In general, a fabric with the above described setting complies with the requirements but with various media difficulties may occur when the filter elements are cleaned in that residues of separated solids adhering to the fabric have to be washed off by means of water under high pressure.

Especially during this procedure thread displacement as mentioned above may occur with a densification of the horizontally running threads in the bag-shaped filter elements, whereby relatively large zones without fabric are formed. The solids may occasionally pass in these zones so that the process does not always work in a satisfactory manner.

The danger of thread displacement of this kind mostly arises when the filter elements are cleaned with water under a pressure exceeding 2 bar, in some cases more than 5 or even 10 bar. It is, therefore, desirable to develop a three-dimensional filter element of flat textile structures which, as a result of its construction, keeps the defined porosity, avoids the disadvantages described above and has a positive influence or the peeling behaviour of the separated solids content.

It is, therefore, the object of the present invention to provide a three-dimensional filter element of a porous, flat textile structure of synthetic fibers the individual threads of which are bound to each other so as to be unshiftable. A fabric of this type should have an air permeability of over 50, preferably at least 200 and more preferably 340 to 1,500 l/dm$^2$.min with a pressure difference of 2 millibar and should resist a permanent load over the entire filter area without the formation of free zones.

It is another object of this invention to use the porous, flat textile structures of synthetic fibers as filter elements for the separation of solids from a liquid phase, especially waste waters or sludges.

The displacement resistance of the fabric can be obtained by crossing, knotting, overcasting and similar binding and construction techniques. Preferred structures to prevent the displacement of threads are leno weaves, mock leno weaves and half twist weaves. With fabrics of this type one warp thread deviates from the otherwise strictly parallel position and is arranged like a loop around at least one other thread running in the same direction. Nets such as those with knots or without knots, knitted fabrics, such as warp-knitted fabrics and stitch-bonded fabrics as well as knittings can also be used.

With these structures and weave settings it is possible to vary the pore size or air permeability of the textile fabric in such a manner that a pore size or air permeability may be chosen which is adapted to the media to be separated respectively and which ensures an optimum separating efficiency with a high solid separation and with economical selection of the material. The resistance to displacement of the fabric must be so high that even under a permanent load the air permeability remains unchanged over the entire filter surface without formation of free regions. In this manner, no regions are formed during operation in which the air permeability exceeds 2,000, especially 1,500 l/dm$^2$.min with a pressure difference of 2 millibar. The flat structures are prepared from material which adsorbs the forces produced as the liquid is poured in.

The flat textile structures are made from filament and/or fiber yarns of synthetic filaments (multifilaments and/or monofilaments). Especially suitable materials include those made from polyester fibers, such as polyethylene terephthalate, polybutylene terephthalate, poly-1,4-dimethylol-cyclohexane terephthalate and analogous materials on the basis of isophthalic acid; polyamides such as poly(hexamethylene-adipic amide), polyhexamethylene sebacic amide, polyundecanoic amide, polycaprolactam; and also poly-p-phenylene terephthalic amide. Fabrics made from fibers of polyacrylontrile and copolymers of acrylonitrile with at least one further monomer having an acrylonitrile content of at least 85% can also be used.

For the preparation of the filters it proved advantageous to use yarns with considerably improved resistance to ultraviolet light, for example by using filament yarns dyed with carbon black. Moreover, it is suitable in many cases to treat the yarns or the textile fabrics made therefrom with a bactericide, algicide and/or fungicide. Especially when municipal waste waters are to be purified or organic sludges are to be drained, bacteria may evantually grow on the outer surface of the three-dimensional filter element which may impair the separating effect after some time. By the aforesaid treatment of the filter material with a bactericide, algicide and/or fungicide the formation of a biological layer is prevented for a prolonged period of time.

The three-dimensional, preferably bag-shaped filter elements according to the invention are preferably provided with a closure at its lower end. Alternatively, they can be closed in different manner for example by squeezers, ribbons or wire so that the separated solids cannot issue at that part of the filter. The entire portion above the closure is fully available for draining by use of the displacement-resistant fabrics since there is no displacement of the individual filament yarns and the fabric has no denser weave in these regions.

The filters according to the invention can be used for the most different systems, for example solids-containing waste waters, sludges, for example all types of municipal sewage sludges, such as raw sludge and activated sludge, industrial sludges, sludges from abbatoirs, dairies, fruit and vegetable industries, sludges from railway service, sludges from electrodeposition and hydroxide sludges, sludges produced in the ceramic industry, e.g. in the field of fine pottery, from metallurgical works, paper sludges from paper industry, sludges from sugar industry, sludges from the production of plywood and wood-fiber boards, sludges resulting from wine pressing, for the purification of latex-containing waste water and waste waters from the fabrication of plate glass or from the grinding of the same, liquid manure and especially for sludges which solids firmly adhere to the fabric, such as activated sludges and the like.

The fabric to be used in accordance with the invention is suitable for all filtering processes, especially those in which the liquid passes through the filter by gravity.

In general, it is often desired to supply to the filtering apparatus equipped with the three-dimensional filter elements a medium which has been treated by flocculating agents which include precipitating agents and/or flocculating auxiliaries. Suitable flocculating agents include, for example aluminum chloride and sulfate, ferric chloride and/or calcium hydroxide, which may be advantageously combined with flocculating auxiliaries in a narrow sense such as polyacrylates or polyacrylamides.

Further features and advantages in accordance with the present invention will become more apparent from the following specification taken in connection with the drawings given by way of example and in which:

FIGS. 1 and 2 represent filtrate volume-time curves.

The following example illustrates the invention.

EXAMPLE 1

(a) Determination of the air permeability of the filter material

The air flow resistance of three polyester fiber fabrics (polyethylene terephthalate) was measured according to DIN No. 53 887.

The fabrics used for the test (in the following defined as fabric I, fabric II and fabric III) had the following characteristics:

| weave | titer (dtex) | setting (filaments/cm) | weight (g/cm$^2$) |
|---|---|---|---|
| fabric I clamp (see FIG. 3) | 2,200 | warp 9.4 weft 12 | 510 |
| fabric II leno | 1,670 2,200 | warp 10.2 weft 5.6 | 345 |
| fabric III panama (comparison) | 2,200 | warp 8.5 weft 8.5 | 410 |

The test device used consisted of a clamping device, a vacuum pump, an air flow meter, controlling means and differential manometer. Under a differential pressure of 2 millibar the following values were measured for the three fabrics:

| fabric I | 340 1/dm$^2$ . min |
| fabric II | 1,000 1/dm$^2$ . min |
| fabric III | 580 1/dm$^2$ . min (comparison) |

(b) Determination of the filtration properties of the filter materials

A mixed sludge and an activated sludge having a solids content of 0.6 and 3.1% by weight, respectively, were filtered under a filtration pressure of 0.3 bar on a filter apparatus consisting of a pressure filter having a surface of 0.01 m$^2$, a filter housing, a microprocessor (printer and automatic storage), automatic pressure measuring and controlling equipment and electrical balance with connected recorder. The sludges had been pretreated with a commercial flocculation agent, i.e. an organic polyelectrolyte on the basis of a polyacryl amide. The test results are illustrated in FIGS. 1 and 2, which demonstrate the filtrate volume in dependency on the filtration time using a filtration pressure of 0.3 bar. The filtrate volume-time curves demonstrate that the filter materials had no influence on the filter efficiency in the case of the mixed sludge (FIG. 1) and a minor influence only with the activated sludge (FIG. 2). The filter efficiency was 18 and 12-14 m$^3$/m$^2$.hr of sludge, respectively. With a thickness of 10 and 45 mm. respectively, the filter cake had a solids content of 10 and 20% by weight; no difference with the individual fabric was observed.

The degree of separation of the solid content from the sludges was examined by optical measurements in a photo-electric colorimeter of the clarified waste waters in comparison with fully desalted water (0% light absorption). The filtrate of fabric III (comparison) showed a light absorption of almost 15%, while the filtrates obtained with fabrics I and II showed values of 12 and 18%, respectively, which were slightly below or above the former value. Hence, no substantial differences were found in the degree of solids separation obtained with the different filter materials. A clogging of the pores of the fabrics was not observed after repeated filtration through the same, cleaned fabric.

In all experiments the filter cake could be removed readily from the filter material.

(c) Testing of thread displacement of the filter materials

After having terminated the filtration experiments, the filter materials (fabrics I to III) were clamped in and cleaned by a high pressure hot water jet. At a distance of 30 cm between the spraying nozzle and filter material the pressure at the nozzle was 15 bar.

With fabrics I and II no thread displacement could be ascertained and the values of the air permeability remained unchanged, whereas fabric III showed considerable displacement while the air permeability was increased to 1,060 l/dm$^2$.min.

What is claimed is:

1. A method for the separation of solid material from a liquid phase which comprises pouring a liquid containing solids into a three-dimensional filter element which consists of a fabric of synthetic fibers the individual threads of which are bound to each other by at least one technique selected from the group consisting of crossing, knitting and overcasting so in an unshiftable manner without the threads being permanently bonded together at the contact points between the warp and weft, said fabric having an air permeability of more than 50 l/dm$^2$.min at a pressure difference of 2 millibar and resistant to a permanent load over the entire filter area without formation of free regions; passing the liquid through said fabric and thus filtering off the solids content.

2. A method as claimed in claim 1, wherein the liquid passes the filter element by means of gravity.

3. A method as claimed in claim 1, wherein the liquid containing solids is pretreated with at least one flocculating agent.

4. A method as claimed in claim 1, wherein the liquid phase to be treated is selected from the group consisting of municipal sewage water, sludge and industrial sludge.

* * * * *